Dec. 26, 1944.  J. A. FORBES  2,366,093
BRAKE
Filed July 21, 1941

INVENTOR.
JOSEPH A. FORBES
BY
ATTORNEYS

Patented Dec. 26, 1944

2,366,093

UNITED STATES PATENT OFFICE 2,366,093

BRAKE

Joseph A. Forbes, Detroit, Mich., assignor to Kelsey-Hayes Wheel Company, Detroit, Mich., a corporation of Delaware Application July 21, 1941, Serial No. 403,435

1 Claim. (Cl. 188—72)

The invention relates to brakes and refers more particularly to brakes for wheels and especially aircraft wheels.

The invention has for one object to provide a powerful brake which can be compactly arranged.

The invention has for another object to provide a brake so constructed that the rotatable friction members may be fixedly secured to the wheel to avoid rattle and noise.

The invention has for a further object to provide an improved brake in which the relatively axially movable friction members exert balanced or equal pressures when applying the brake.

With these and other objects in view, the invention resides in the novel features of construction and combinations and arrangements of parts as more fully hereinafter set forth.

Figure 2:
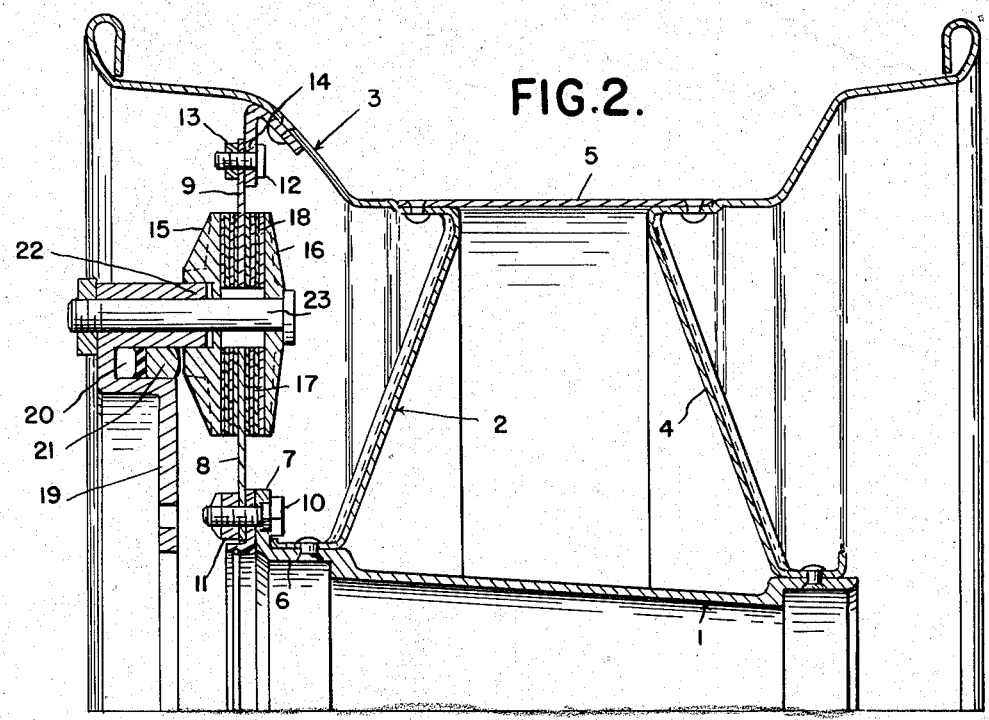
Figure 2 is a cross section on the line 2—2 of Figure 1.
Figure 1:
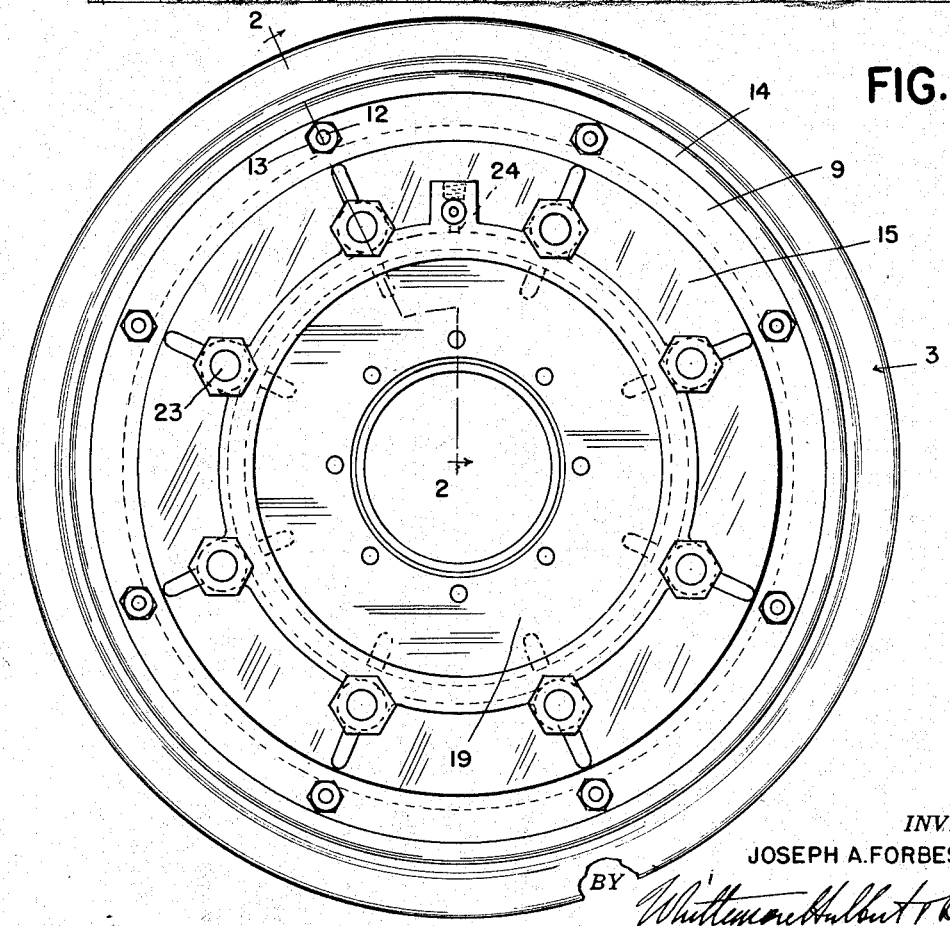
Figure 1 is an elevation of a wheel and brake embodying my invention.

The brake embodying my invention is particularly applicable to wheels for aircraft and, more especially, airplanes. As illustrated, the wheel comprises the hub 1, the wheel body 2, and the tire carrying rim 3. The body and rim are shown as formed of two sheet metal elements 4 and the sheet metal ring 5 extending between and secured to these elements intermediate their inner and outer edges and completing the rim, which is of the drop-center type. The inner edges of the side elements are fixedly secured to the enlarged portions 6 at the ends of the hub. One of the enlarged end portions terminates in the radially extending annular flange 7.

The brake is of the disc type and comprises rotatable friction members fixedly secured to the wheel and non-rotatable friction members engageable with opposite sides of the rotatable friction members and carried by a support upon the axle upon which the wheel is journaled. In detail, 8 and 9 are substantially concentric inner and outer sheet metal discs secured respectively to the hub 1 and the rim 3 in substantially radial alignment. The inner disc 8 is secured at its inner edge to the radial flange 7 as by means of the bolts 10 and the nuts 11. The outer disc 9 is secured at its outer edge to the rim 3 as by means of the bolts 12 and the nuts 13, the bolts extending through a radial flange of the V-shaped ring 14 having its other flange fixedly secured to a side wall of the well of the rim. 15 and 16 are non-rotatable inboard and outboard discs coaxial with and at opposite sides of the discs 8 and 9 and engageable with the friction linings 17 and 18, respectively, secured to the opposite sides of the discs 8 and 9. The non-rotatable discs 15 and 16 are preferably formed of some metal other than sheet metal to be substantially rigid and they are preferably radially ribbed to increase their rigidity. The non-rotatable discs 15 and 16 are concentric with and carried by the support 19 which, as above stated, is fixedly secured to the axle. The support is formed with the concentric annular cylinder 20 within which is located the annular piston 21 for engaging the central or hub portion of the inboard disc 15. The support is also formed with the concentric series of angularly spaced axial projections 22 upon which the inboard disc 15 is slidably mounted. The support further has the bolts 23 extending axially through the projections 22 and carrying the outboard disc 16. It will be noted that the bolts 23 extend through the space between the rotatable discs 8 and 9. The annular cylinder 20 is adapted to be connected to a suitable master cylinder through the passage 24 formed in the support between adjacent projections 22.

With the above construction of brake, a relatively large braking area and at the same time a compact structure are secured, adapting the brake for use especially with airplane wheels. The non-rotatable friction members are adapted to exert balanced or equal pressures on opposite sides of the rotatable friction members and the balancing or equalizing of the pressures is facilitated by making the rotatable friction members resilient and adapted to flex axially to thereby automatically center their braking surfaces with the non-rotatable friction members when the latter are applied. Also the rotatable friction members being fixedly mounted eliminates rattle and noise between the same and the wheel.

What I claim as my invention is:

In a brake, a set of rotatable substantially concentric inner and outer friction members having adjacent edges in substantially radial alignment, a second set of non-rotatable friction members at opposite sides of and engageable with said inner and outer friction members, a non-rotatable support having angularly spaced axial projections on which one of said non-rotatable friction members is slidably mounted, means on said support extending between the adjacent edges of said inner and outer friction members for carrying the other of said non-rotatable friction members, and an annular member separate from said carrying means and movably mounted on said support and engageable with one of said non-rotatable friction members for moving the same relatively toward the other of said non-rotatable friction members.

JOSEPH A. FORBES.